PEN DRIVE FOR RECORDERS AND THE LIKE

Filed May 31, 1960 2 Sheets-Sheet 1

EVERETT W. MOLLOY,
INVENTOR.

BY HIS ATTORNEYS.

HARRIS, KIECH, RUSSELL & KERN.

PEN DRIVE FOR RECORDERS AND THE LIKE

Filed May 31, 1960 2 Sheets-Sheet 2

EVERETT W. MOLLOY,
INVENTOR.

BY HIS ATTORNEYS.

HARRIS, KIECH, RUSSELL & KERN.

United States Patent Office 3,084,014

Patented Apr. 2, 1963

3,084,014

PEN DRIVE FOR RECORDERS AND THE LIKE

Everett W. Molloy, Tunis, Tunisia, assignor to Beckman Instruments, Inc., Fullerton, Calif., a corporation of California Filed May 31, 1960, Ser. No. 33,048
4 Claims. (Cl. 346—139)

This invention relates to recorders wherein data are recorded on a recording medium moving along one coordinate axis by a marking member moving along another coordinate axis. In particular, the invention relates to new and improved means for driving the marking member across the recording medium. In the specific embodiment described herein, the recording medium is paper and the marking member is a pen, but, of course, the drive mechanism is equally suitable for use with various other recording media and marking members.

It is an object of the invention to provide a recorder wherein the marking pen is carried in a guide member that is supported in cantilever style over the recording surface with the marking pen being reciprocated in the guide member by a drive mechanism positioned at the support end of the guide member. A further object is to provide a recorder having the marking pen supported in a cantilever guide permitting various types of recording papers, such as continuous strips, single sheets, circular charts, and endless loops, to be used therewith. A further object of the invention is to provide a drive system for a potentiometric type recorder wherein the position feedback resistor is mounted in the cantilever-supported guide member with the resistor contact and the marking pen fixed together for direct drive by the output motor.

It is an object of the invention to provide a recorder pen drive wherein the recorder pen is carried by a strip which is reciprocated in a cantilever guide member by a drive motor positioned at the support end of the guide member. A further object is to provide such structure wherein the guide member has an arcuate section positioned to one side of the recording surface and the reciprocating strip is flexible so that it can be withdrawn into the arcuate section to provide a compact overall structure for the recorder. Another object is to provide such structure wherein the reciprocating strip carries a gear rack for direct drive from a spur gear of the drive motor thereby eliminating the backlash encountered in conventional drives.

It is an object of the invention to provide a recorder having a recording surface, means for driving a recording medium along the surface, a marking member for marking on the medium, an elongate guide for the marking member, a guide support fixed to one side of the recording surface and supporting the guide over the surface with its longitudinal axis parallel thereto, and drive means for reciprocating the marking member in the guide along the longitudinal axis thereof, with the drive means fixed at the one side of the recording surface.

It is a specific object of the invention to provide a recorder drive including a cantilever guide member formed of parallel channel members spaced from and facing each other to define a guide space, with a reciprocating strip positioned in the guide space and engaging one of the channel members in supporting relation, with the strip carrying the marking pen and the resistor contact.

It is a further object of the invention to provide a pen drive for a recorder which is compact, accurate, inexpensive and trouble free. The invention also comprises novel details of construction and novel combinations and arrangements of parts, which will more fully appear in the course of the following description. The drawings merely show and the description merely describes a preferred embodiment of the present invention which are given by way of illustration or example.

Figure 1:
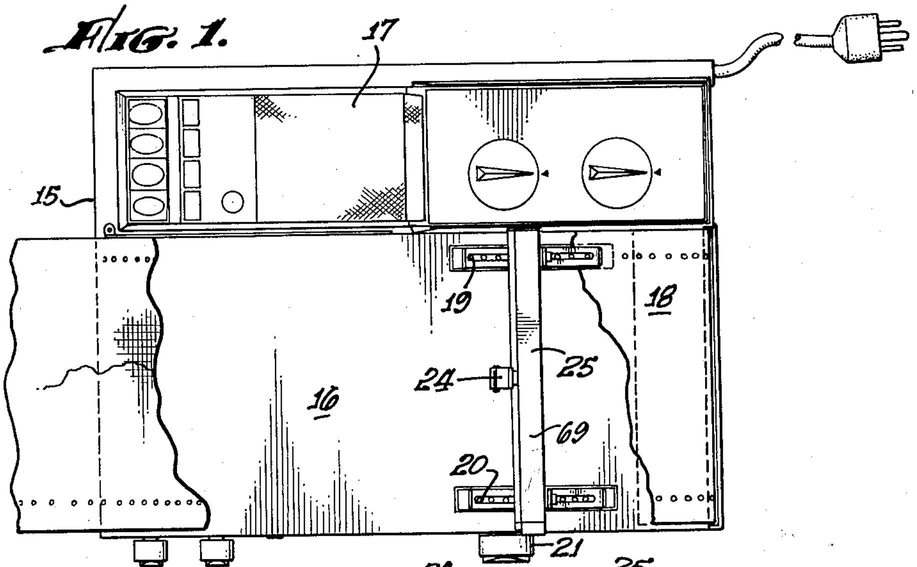
FIG. 1 is a plan view of a preferred embodiment of the invention.

The recorder of the invention is contained in a housing 15 having a flat upper surface 16 which serves as the recording surface. A control section 17 is provided to one side of the recording surface. A recording medium, such as a roll of chart paper 18 may be mounted within the housing 15 for movement along the recording surface by suitable drive means, such as toothed drive members 19, 20 which engage corresponding slots in the paper. A knob 21 is connected to the chart drive wheels to provide manual movement of the chart paper. The components described in this paragraph are conventional in nature and may take various known forms.

A chart marking member in the form of a pen 24 is positioned above the recording surface 16 in a guide 25, the guide being supported over the recording surface in cantilever style from the control section 17. When in use, the chart is advanced along the recording surface at the desired rate, ordinarily at a constant velocity, and the pen is reciprocated in the guide in response to the incoming data to be recorded. The details of the pen drive will be described hereinbelow.

Figure 2:
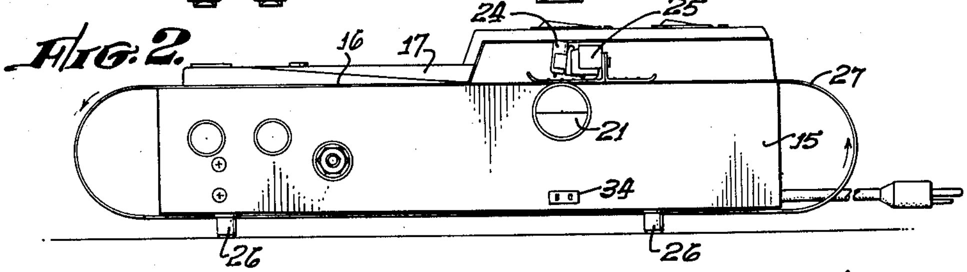
FIG. 2 is a side elevation of the instrument of FIG. 1 showing an endles loop of chart paper mounted thereon.

The cantilever suspension for the marking pen permits the use of various types of chart paper with the recorder of the invention. The conventional roll or strip of chart paper is shown in FIG. 1. The housing 15 is supported on short legs 26 and an endless loop 27 of chart paper can be positioned around the housing and slid over the recording surface under the guide (FIG. 2). The loop will be driven over the recording surface past the marking pen continuously to provide a long-term record without consuming a large quantity of paper or without risk of exhausting the paper in a roll.

Figures 9, 10:
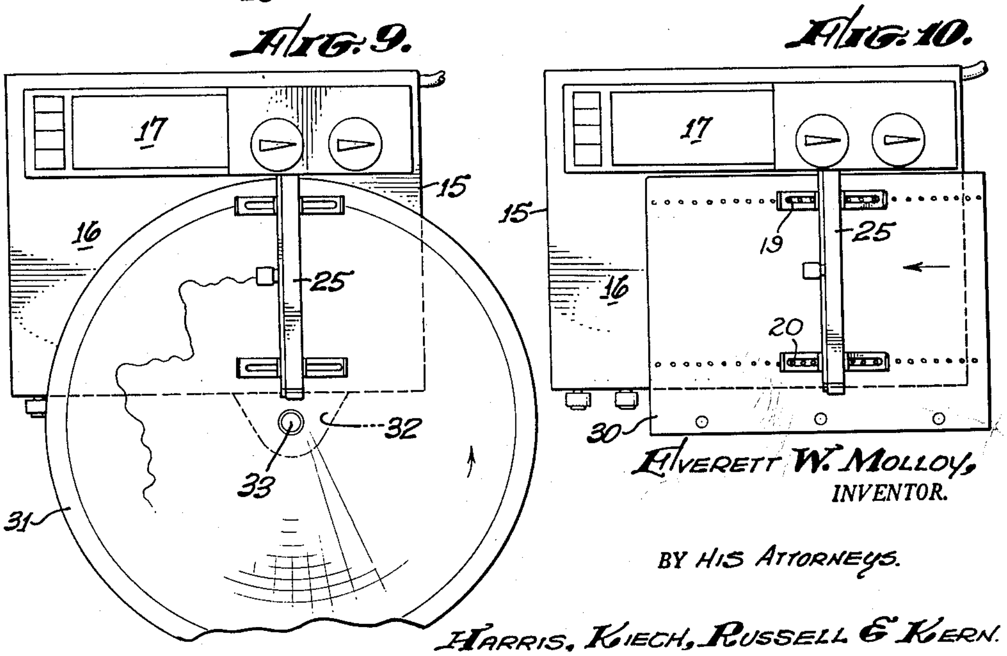
FIG. 9 is a plan view similar to that of FIG. 1 showing the instrument in use with a circular chart.
FIG. 10 is a plan view similar to that of FIG. 9 showing the instrument in use with a single sheet of chart paper.

FIG. 10 illustrates how a single sheet 30 of chart paper can be used with the recorder of the invention. Here the sheet 30 is a sheet of 8½ x 11 notebook paper already punched with three holes so that the record made by the recorder can be inserted in a notebook. Of course, there is no restriction on the size of the sheet, it merely being necessary to perforate the sheet for engagement by the drive wheels of the recorder. A friction drive system could be used in place of the toothed drive members to eliminate the requirement for perforations in the sheet.

FIG. 9 illustrates how the recorder of the invention can be used with a circular chart 31. The circular chart is carried on a drive unit 32 having a vertically disposed drive shaft 33. The drive unit 32 may be detachably mounted on the side of the housings 15, plugging into an outlet socket 34 (FIG. 2) which provides power for energizing the drive unit motor. The arrows in FIGS.

2, 9 and 10 indicate the usual direction of movement of the chart paper, but the direction may be reversed if desired.

Figures 3, 4, 5, 6, 7, 8:
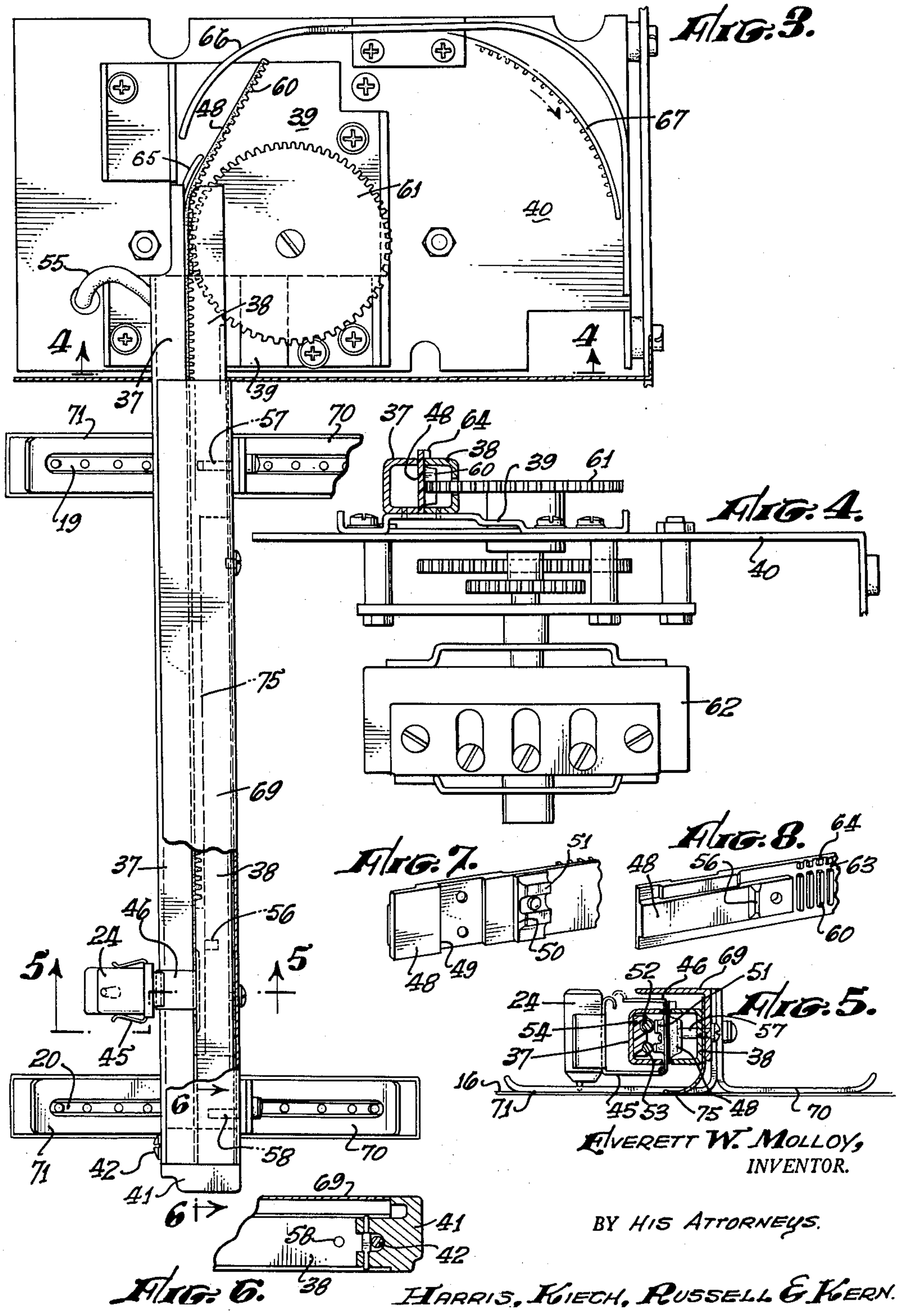
FIG. 3 is an enlarged plan view of the pen drive of the instrument of FIG. 1.
FIG. 4 is a sectional view taken along the line 4—4 of FIG. 3.
FIG. 5 is a sectional view taken along the line 5—5 of FIG. 3.
FIG. 6 is a partial sectional view taken along the line 6—6 of FIG. 3.
FIGS. 7 and 8 are isometric views of one end portion of the driven member.

The details of the pen drive are shown in FIGS. 3–8. The guide 25 includes channel members 37, 38 mounted on a plate 39 by suitable means such as riveting or spot-welding, with the open ends of the channels facing each other and spaced to provide a guide space therebetween (FIG. 4). The plate 39 is mounted on another plate 40 which forms a portion of the housing 15, by suitable means such as screws. An end plug 41 is positioned at the free ends of the channel members 37, 38 to close the open end of the guide and space the channel members apart, the plug being held in place by a screw 42 (FIGS. 3 and 6).

The marking pen 24 is resiliently gripped in a pivot bracket 45 which, in turn, is pivotally mounted in a pen support angle 46 (FIG. 5). In FIG. 5, the pen is shown in engagement with the recording surface 16. The pen may be positioned out of engagement with the recording surface by lifting the pivot bracket 45 and positioning the hooked edge thereof over the support angle 46, as shown in phantom lines.

The pen is reciprocated in the guide by means of a driven member 48 which slides in the guide space between the channel members 37, 38. In the preferred form shown herein, the driven member is a flexible strip of nylon having suitable guide means for engaging the channel members and means for engaging a drive motor positioned to one side of the recording surface. The driven member is shown in detail in FIGS. 7 and 8 and is provided with a notched section 49 for receiving the pen support angle 46, the pen support angle being riveted in place in the notch 49. A boss 50 provides support for a U-shaped electrical contact 51 which rides on a resistor 52 and a conductor 53 mounted in an insulator block 54 carried in the channel 37 (FIG. 5). The resistor and conductor are connected to the control section of the recorder through a cable 55 to provide a signal which varies as a function of the position of the pen along the guide for use in potentiometric type recording. A boss 56 on the driven member provides a limit control on the movement of the driven member by engagement with pins 57, 58 carried in the channel 38.

The driven member 48 is provided with a gear rack 60 for engagement with a spur gear 61 which is driven by a motor 62 for moving the driven member in the guide. A longitudinal groove 63 in the gear rack of the driven member permits the major portion of the gear teeth to ride between the arms of the channel member 38 with a small portion 64 positioned above the upper arm of the channel member, thus providing a support for the driven member (FIGS. 4 and 8).

The channel member 37 includes an arcuate tongue 65 which projects beyond the gear 61. An arcuate guide member 66 is mounted on the plate 40 to provide an approximate continuation of the tongue 65. As the driven member 48 is withdrawn from the guide by clockwise rotation of the gear 61, the driven member is bent into an arc to the position shown in phantom lines at 67. This structure permits the driven member to have a relatively long stroke while requiring a relatively small space for the drive system.

A cover angle 69 may be fixed to the channel 38 to provide a cover over the guide space and the reciprocating driven member. A pair of guide arms 70, 71 may be fixed at each end of the guide for maintaining the perforated chart paper in engagement with the toothed members 19, 20. It should be kept in mind that the guide 25 formed of the channel members 37, 38 is not supported by the guide arms 70, 71 but is supported only from the plate 39 at the side of the recording surface. The guide arms 70, 71 are spaced slightly above the recording surface so that the chart paper may freely slide therebetween.

A strip 75 of flexible resilient material, such as mylar or the like, may be mounted on the guide so that the strip is flexed to bring a substantial portion of an edge into engagement with the recording surface, as best seen in FIG. 5. The strip should cover substantially the entire distance between the drive members and should be positioned a short distance upstream from the marking pen. The strip produces a pressing action on the chart paper as it is driven past the pen by the drive wheels and substantially eliminates wrinkling of the paper, particularly the V-shaped wrinkles which tend to appear as a long strip of paper is driven along the recording surface.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a recorder having a recording surface and means for driving a recording medium along the recording surface, the combination of: a marking member; an elongate guide member having a straight section and an arcuate section; a guide member support mounted on said recorder at one edge of said recording surface for supporting said guide member with the straight section thereof above said recording surface; a drive motor having an output shaft rotating as a function of the data to be recorded; and a flexible driven strip slidably supported in said guide member, said last named member thereby preventing flexure of said flexible driven strip, said strip having one end portion extending beyond said one edge and engaged by said drive motor in driving relation therewith, and having said marking member mounted on the other end portion for movement across the recording surface as said strip is reciprocated in said guide member by said drive motor between a first position with the marking member remote from said arcuate section and a second position with the marking member adjacent said arcuate section and the major portion of said strip flexed around said arcuate section, said flexible driven strip being under longitudinal tension when driven from said first position to said second position and longitudinal compression when being driven from said second position to said first position.

2. In a recorder having a recording surface and means for driving a recording medium along the recording surface, the combination of: a marking member; an elongate guide member having a straight section and an arcuate section; a guide member support mounted on said recorder at one edge of said recording surface for supporting said guide member with the straight section above said recording surface; a drive motor having an output gear rotating as a function of data to be recorded, with said gear positioned within said arcuate section of said guide member; and a continuously flexible driven strip slidably supported in said guide member, said strip having one end portion extending beyond said one edge into said arcuate section and having a continuous gear rack engaging said drive motor gear in driving relation therewith, and having said marking member mounted on the other end portion for movement across the recording surface as said strip is reciprocated in said guide member by said drive motor between a first position with the marking member remote from said arcuate section and a second position with the marking member adjacent said arcuate section and the major portion of the strip flexed around the arcuate section.

3. In a recorder having a recording surface and means for driving a recording medium along the recording surface, the combination of: a marking member; a guide member including two elongate channel members mounted with their open sides spaced from and facing each other defining a guide space therebetween; a guide member support mounted on said recorder at one edge of said recording surface for supporting said guide member above said recording surface; a drive motor having an output shaft rotating as a function of data to be recorded; an elongate resistor and an elongate conductor mounted in one of said channels in parallel relation; a continuously flexible driven strip slidably disposed in said guide space and having a longitudinal section for engaging the other of said channel members in supporting relation, said strip having one end portion extending beyond said one edge and engaged by said drive motor in driving relation therewith, and having said marking member mounted on the other end portion for movement across the recording surface as said strip is reciprocated in said guide space by said drive motor; said continuously flexible driven strip being in compression when driven in one direction and being under tension when driven in the other direction when said strip is reciprocated in said guide space by said drive motor; and a sliding contact mounted on said strip adjacent said marking member for engaging said resistor and conductor.

4. In a recorder having a recording surface and means for driving a recording medium along the recording surface, the combination of: a marking member; a guide member including two elongate channel members mounted with their open sides spaced from and facing each other defining a guide space therebetween; a guide member support mounted on said recorder at one edge of said recording surface for supporting said guide member above said recording surface; a drive motor having an output gear rotating as a function of data to be recorded; and a driven strip slidably disposed in said guide space and having said marking member mounted thereon for movement across the recording surfaces, said strip including a gear rack along one face thereof engaging said output gear in driving relation, said gear rack having a longitudinal groove therein dividing said rack into first and second portions, with said first portion disposed within one of said channel members and said second portion disposed externally of said one channel member with an arm of said one channel member riding in said longitudinal groove for guiding and supporting said strip as it reciprocates in said guide space.

References Cited in the file of this patent

UNITED STATES PATENTS

| | | |
|---|---|---|
| Re. 12,235 | Weston et al. | June 21, 1904 |
| 671,265 | Cox | Apr. 2, 1901 |
| 2,647,813 | Watson | Aug. 4, 1953 |
| 2,661,082 | Ziegler | Dec. 1, 1953 |
| 2,770,517 | Zabriskie | Nov. 13, 1956 |
| 2,814,546 | Nickel | Nov. 26, 1957 |
| 2,927,838 | Yeiser | Mar. 8, 1960 |